United States Patent [19]
Willett

[11] Patent Number: 5,333,072
[45] Date of Patent: Jul. 26, 1994

[54] REFLECTIVE LIQUID CRYSTAL DISPLAY OVERHEAD PROJECTION SYSTEM USING A REFLECTIVE LINEAR POLARIZER AND A FRESNEL LENS

[75] Inventor: Stephen J. Willett, St. Paul, Minn.

[73] Assignee: Minnesota Mining and Manufacturing Company, St. Paul, Minn.

[21] Appl. No.: 999,089

[22] Filed: Dec. 31, 1992

[51] Int. Cl.[5] .......................................... G02F 1/1335
[52] U.S. Cl. ...................................... 359/41; 359/40; 359/63
[58] Field of Search ...................... 359/40, 41, 63, 70; 353/122

[56] References Cited

U.S. PATENT DOCUMENTS

| | | | |
|---|---|---|---|
| 3,844,650 | 10/1974 | Nicholson et al. | 359/41 |
| 4,525,413 | 6/1985 | Rogers et al. | 428/212 |
| 4,613,207 | 9/1986 | Fergason | 359/98 |
| 4,763,993 | 8/1988 | Vogeley et al. | 350/331 |
| 4,818,074 | 4/1989 | Yokoi et al. | 359/70 |
| 5,206,673 | 4/1993 | Kawahara et al. | 359/70 |

FOREIGN PATENT DOCUMENTS

| | | |
|---|---|---|
| 0295913A2 | 12/1988 | European Pat. Off. . |
| 0488544 | 6/1992 | European Pat. Off. . |
| 62-245215 | 10/1987 | Japan . |
| 2-193183 | 7/1990 | Japan . |
| WO88/02501 | 4/1988 | PCT Int'l Appl. . |

OTHER PUBLICATIONS

"Phase Transition-Type Liquid Crystal Projection Display," Koike et al., *Fujitsu Sci. Tech. J.*, 23, 3, pp. 146-153 (Sep. 1987).

Schadt et al, "New Liquid Crystal Polarized Color Projection Principle," *Japanese Journal of Applied Physics*, vol. 29, No. 10, Oct. 1990, pp. 1974-1984.

Weber, M. F., "Retroreflecting Sheet Polarizer," *Society for Information Display*, 1992, 23.3, pp. 427-429.

*Primary Examiner*—Anita P. Gross
*Attorney, Agent, or Firm*—Gary L. Griswold; Walter N. Kirn; Eric D. Levinson

[57] ABSTRACT

A reflective liquid crystal display overhead projection system. The projection system includes a reflective polarizer, a phase modulating liquid crystal display on the reflective polarizer, and a fresnel lens on the liquid crystal display. Unpolarized light rays are directed toward the fresnel lens, pass through the liquid crystal display, and are reflected and polarized by the reflective polarizer. The light rays then pass back through the liquid crystal display and the fresnel lens and on toward a projector head, where the light rays are analyzed by a polarizer and projected toward a screen.

6 Claims, 1 Drawing Sheet

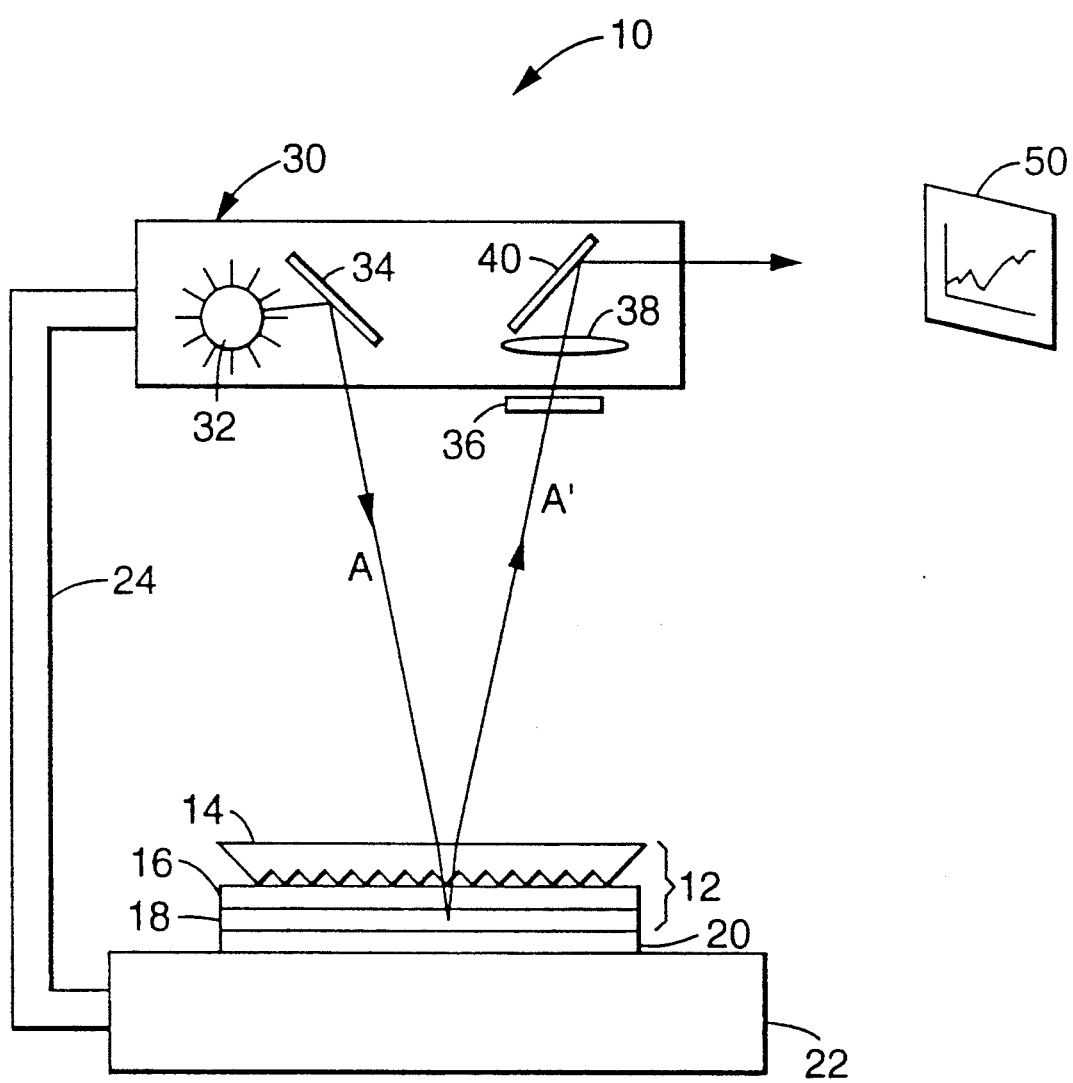

REFLECTIVE LIQUID CRYSTAL DISPLAY OVERHEAD PROJECTION SYSTEM USING A REFLECTIVE LINEAR POLARIZER AND A FRESNEL LENS

FIELD OF THE INVENTION

The invention relates generally to overhead projection systems and more specifically to overhead projection systems employing liquid crystal displays.

BACKGROUND OF THE INVENTION

High resolution liquid crystal displays (LCD), used in conjunction with overhead projectors, have become popular devices with which to project text, graphics and images from personal computers to a large audience. Most LCD projection panels are designed to operate with overhead projectors that are characterized as "transmissive," that is to say, light rays emanating from a projector lamp in the base of the projector, under the LCD, pass through the LCD once before being projected onto a screen. In reflective overhead projectors, however, the lamp is in the "head" of the projector, over the LCD, and the light rays pass down through the LCD and are then reflected back up through the LCD before being projected onto a screen. Reflective overhead projectors are advantageous because they can be condensed into a smaller volume, and thus can be made highly portable. For example, some reflective overhead projectors can fit into a briefcase-like carrying case. When LCD projection panels that have been designed for use with transmissive overhead projectors are used with reflective overhead projectors, the result is usually a very dark, double image.

One reflective overhead projection system includes an LCD having polarizers on both sides. This sandwich is separated by an air gap from a fresnel lens and a reflector. This system has three drawbacks. First, the projected image is a double image because the plane of the image is separated quite some distance from the plane of the reflection. Second, the system suffers from low light transmission—less than 10% for a super twisted nematic LCD. Third, the projected image suffers from glare from the specular reflection of the projector light from the top of the polarizer surface, which obscures the desired image.

Another reflective LCD overhead projection system is shown in Japanese Kokai 2-193,183 published on Jul. 30, 1990. That system uses an LCD pressed against a polarizing plate separated by an air gap from a minor fresnel lens. Light rays from a projector lamp first pass through the LCD, the polarizing plate, and then the air gap. The light rays are then reflected by the minor fresnel lens, and pass back through the polarizing plate and exit the LCD. While this system eliminates the double image problem, the double pass of the light rays through the polarizing plate and the absorption attendant each pass limits the overall brightness achievable with this system, as does absorption by the metallized surface of the fresnel lens.

SUMMARY OF THE INVENTION

Accordingly, the present invention provides an improved reflective LCD overhead projection system having improved brightness and no double image problem. The design of the present invention avoids the loss in brightness caused by both the double pass through the polarizer and reflection at the metallized surface of a mirror fresnel lens which characterize prior art devices. The overhead projection system includes an optical stack which includes a reflective polarizer, a phase modulating liquid crystal display provided on the reflective polarizer, and a fresnel lens provided on the liquid crystal display. Light rays from a projector lamp pass through the fresnel lens and liquid crystal display and are reflected and polarized by the reflective polarizer. The light rays then pass back through the LCD, where their phase is modulated, and then pass back through the fresnel lens. A light absorbing layer can be provided on the side of the reflective polarizer opposite the LCD.

The present invention also includes a reflective liquid crystal display overhead projection system which includes the above optical stack and a projector head having a second polarizer attached to it. The projector head includes a projector lamp and a projection lens. Light rays which travel back through the fresnel lens are directed toward the projector head where they pass through the second polarizer and the projection lens, whereupon they are projected toward a projection screen for viewing by an audience.

The present invention also includes a method of projecting an image displayed by an LCD onto a screen using the projection system described above.

BRIEF DESCRIPTION OF THE DRAWING

The novel features and advantages of the present invention will become more apparent to those skilled in the art upon consideration of the following detailed description which refers to the accompanying drawing, wherein the FIGURE is a schematic side view of an overhead projection system according to one embodiment of the present invention.

DETAILED DESCRIPTION

A reflective LCD overhead projection system 10 according to the present invention is shown in schematic in the FIGURE. The projection system 10 includes an optical stack 12, an optical stage 22, an arm 24, and a projector head 30.

The optical stack 12 includes a reflective polarizer 18, a phase modulating LCD 16 provided on the reflective polarizer, and a transmissive fresnel lens 14 provided on the LCD. Various images can be displayed by the LCD by electronic connection to various video sources such as a video cassette recorder, television tuner, or computer. An optional absorbing layer 20 can be provided on the side of the reflective polarizer 18 opposite the LCD. The optical stack 12 can be supported by the stage 22 of the projection system 10.

The projector head 30 is suspended above the stage 22 by the arm 24, which can be configured to allow the projector head to be folded toward the stage. The projector head 30 includes a projector lamp 32, an optional mirror 34, a projection lens 38, and an optional mirror 40. A polarizer 36 should be placed either within the projector head 30, or attached to it as shown in the FIGURE.

The projection system 10 operates as follows. An unpolarized (random phase) light ray A emanating from the projector lamp 32 is directed toward the optical stack 12. Optionally, the mirror 34 can be used to direct the light ray A toward the optical stack 12, as shown in the FIGURE. The light ray A first passes through the transmissive fresnel lens 14 and then passes through the phase modulating LCD 16. After passing through the phase modulating LCD 16, the light ray A is still in random phase, i.e., non-imaging, because it has entered the LCD in random phase. The light ray A is then reflected and polarized by the reflective polarizer 18, thereby forming polarized light ray A'. An optional absorbing layer 20 can be included to prevent the reflection and retransmission of undesired light. The polarized light ray A' then passes back through the LCD 16.

The LCD 16 is comprised of thousands of small picture elements, or "pixels", Which are either "on", "off", or "partially on". An image is displayed by the LCD 16 by the appropriate manipulation of the individual pixels. In the case of a twisted nematic (TN) LCD, if a particular pixel is "on", then the phase, and thus the polarization, of the linearly polarized light ray A' will remain unchanged as it passes through the pixel. However, if the pixel is "off", then the light ray A' will be rotated, i.e., its phase will be modulated so that its polarization angle is changed by 90 degrees. If the pixel is "partially on", then the light ray A' will be rotated by less than 90 degrees. An "on" pixel can be designated to represent either black or white. If the "on" pixel is designated as black, then the "off" pixel is designated as white, and vice versa. A "partially on" pixel represents a shade of gray.

In the case of a super twisted nematic (STN) LCD, the optical effect arises from birefringence effects so that "on ", "off" and "partially on" pixels each have a characteristic birefringence color. If the "blue mode" is used, the "off" pixel will have a blue color while the "on" pixel will be cream colored. If the "yellow mode" is used, the "off" pixel will be yellow and the "on" pixel will be blue-gray. A film may be added on top of the STN LCD to neutralize the color of the display, i.e., to convert the color display to a black and white display.

The polarized light ray A' then passes back through the fresnel lens 14 toward the projector head 30. The polarized light ray A' then passes through the polarizer 36 which acts as an analyzer, making the phase-modulated images (generated only on the upward passage of the polarized light ray A' through the LCD 16) visible on a projection screen. The polarized light ray A' then passes through the projection lens 38, which can be used to focus the image displayed by the LCD 16 onto a screen 50 for viewing by an audience. It is usually desirable to include the mirror 40 to direct the light ray A' in the direction of the screen 50. In the alternative, the polarizer 36 can be positioned so that the light ray A' passes through the projection lens 38 before passing through the polarizer 36.

The optical stack 12, which can include the absorbing layer 20, is preferably constructed as a single optical unit. This unit could constitute the stage of a reflective overhead projector devoted exclusively to LCD projection. Alternatively, the unit could be packaged so that the user places it on the stage of a standard reflective overhead projector. The user would then attach the polarizer 36 to the projector head. The user could then switch back to conventional transparencies by removing the optical unit and the polarizer 36.

The fresnel lens 14 can be mechanically held in position against the LCD 16 so that the grooved surface of the fresnel lens touches the LCD. In the alternative, the flat surface of the fresnel lens 14 could by adhered to the LCD 16 so that the grooved surface of the fresnel lens faces away from the LCD. This would, however, make the grooves of the fresnel lens 14 vulnerable to finger prints and scratches. The reflective polarizer 18 is preferably laminated to the LCD 16 to eliminate loss at the air interfaces. The optional absorbing layer 20 can be laminated to the reflective polarizer 18.

The type of polarizer selected for the polarizer 36 should match the type of polarizer used for the reflective polarizer 18, and both of these polarizers should match the phase-modulation type of the LCD 16. For example, if the LCD 16 is a linear phase-modulating LCD, then the polarizers 18 and 36 should both be linear polarizers. If the LCD 16 modulates circularly polarized light, then the polarizers 18 and 36 should both be circular polarizers.

Preferred linear polarizers include micro-prism array MacNeille polarizers, birefringent interference polarizers, and circular polarizers used in conjunction with quarter-wave length retarding plates.

A MacNeille polarizer comprises alternating repeating layers of a pair of thin film materials deposited on a bulk substrate material. The pair of thin film materials comprises one low refractive index material and one high refractive index material. The indices, called a MacNeille pair, are chosen such that, for a given angle of incidence of a light beam, the reflection coefficient for p-polarized light ($r_p$) is essentially zero at each thin film interface. The angle at which $r_p$ is zero is called the Brewster angle, and the formula relating the Brewster angle to the numerical values of the indices is called the MacNeille condition. The reflection coefficient for s-polarized light ($r_s$) is non-zero at each thin film interface. Therefore, as more thin film layers are added, the total reflectivity for s-polarized light increases while the reflectivity for p-polarized light remains essentially zero. Thus, an unpolarized beam of light, incident upon the thin film stack, has some or all of the s-polarized components reflected while essentially all of the p-polarized component is transmitted.

A preferred micro-prism array MacNeille polarizer has a Brewster angle construction on a polycarbonate base such as Optical Lighting Film ™, available from 3M Company, St. Paul, Minn. The base should be planar on one side and have numerous tiny prisms on the other. The prisms should be right-angle prisms and have a height of about 7 mils (0.2 mm). Ten pairs of alternating layers of silicon dioxide and titanium dioxide should be placed over the prisms. A second layer of Optical Lighting Film ™ which is identical to the first layer but lacks the additional layers of silicon and titanium dioxide is optically laminated to the first layer so that the prisms on each layer face each other and are enmeshed between each other.

The use of birefringent interference polarizers is explained in U.S. Pat. No. 4,525,413 at column 28, line 29 to column 30, line 15, which explanation is incorporated herein by reference. Published European Patent Application 0,488,544 A1 discloses a birefringent interference polarizer which may be used with the present invention. That publication discloses "a birefringent interference polarizer comprising multiple alternating oriented layers of at least first and second polymeric materials having respective nonzero stress optical coefficients which are sufficiently different to produce a refractive index mismatch between the first and second polymeric materials in a first plane which is different from the refractive index mismatch between the first and second polymeric materials in a second plane normal to the first plane." (column 2, lines 22-31).

The above listed linear polarizers can be used for either polarizer 18 or 36. The polarizers 18 and 36 can be of the same type, or of different types, so long as both polarizers are linear polarizers and are properly aligned with each other. The polarizer 36 can also be a standard absorbing polarizer such as a Polaroid HN42 absorbing polarizer.

A preferred circular polarizer for the polarizer 18 is one that includes cholesteric liquid crystal materials. Cholesteric liquid crystals reflect light having a circular polarization given by the handedness of the cholesteric helix and having a wavelength determined by the pitch of the cholesteric helix. Cholesteric liquid crystals are discussed in "New Liquid Crystal Polarized Color Projection Principle" by M. Schadt and J. Funfschilling, *Japanese Journal of Applied Physics*, Vol. 29, No. 10, October 1990, pp. 1974–1984.

The present invention can be used with any LCD that operates with polarized light. The present invention will now be further described with regard to the following non-limiting example.

EXAMPLE

A reflective LCD overhead projection system was assembled using a 3M model 6200 portable overhead projector. The fresnel lens 14 used was the fresnel lens element from the 3M model 2100 overhead projector. The LCD 16 used was a Kyocera model KL6430 supertwisted nematic LCD with its polarizers removed from both sides of the LCD. The reflective polarizer 18 used was comprised of two layers of Optical Lighting Film ™ sandwiched together as described above. The polarizer 36 used was a standard efficiency linear polarizer (29% transmission of unpolarized light) mounted in glass, oriented for maximum contrast in the supertwisted nematic yellow mode. Measurements of transmission of the projected images were made in a dark room at the screen plane with a photometric detector covering a large number of LCD pixels.

The same measurements were performed on the two prior art systems discussed in the Background of the Invention section, one of which had a polarizer on both sides of the LCD, and the other which was shown in Japanese Kokai 2-193,183. In the case of the projection system shown in the Japanese Kokai, the same Kyocera model KL6430 supertwisted nematic display LCD described above was used, except that the polarizer below the LCD was left in place. This polarizer is a neutral polarizer which transmits 42% of incident light and resembles the Polaroid model HN42 polarizer. The mirror fresnel lens of the optical stage of the 3M model 6200 portable overhead projector was used. The same standard efficiency linear polarizer described above was used in the projector head. These parts were then assembled into a 3M model 6200 portable overhead projector.

In the case of the prior art reference having polarizers on both sides of the LCD, the same LCD display was used, but this time both of its polarizers (which are identical) were left intact. The mirror fresnel lens described above was used. The polarizer in the projector head was removed. These parts were then assembled into the 3M model 6200 portable overhead projector.

The results of the measurements are shown in Table 1.

TABLE 1

| Device | Transmission |
| --- | --- |
| 3M M6200 with standard linear polarizer | 100.0% |
| Prior art: polarizer on each side of LCD, no standard polarizer in projector head. | 25.5% |
| Prior art: Japanese Kokai 2-193,183 | 38.3% |
| Present invention | 43.7% |

The data in TABLE 1 indicate that the present invention yields 14 % greater projected brightness than the prior art Japanese Kokai 2-193,183, and 71% greater brightness than the prior art device having a polarizer on each side of the LCD.

I Claim:

1. An optical stack for use in a reflective liquid crystal display projection system comprising a reflective micro-prism array MacNeille polarizer, a phase modulating liquid crystal display provided on the polarizer, and a transmissive fresnel lens provided on the liquid crystal display, wherein unpolarized light rays directed toward the fresnel lens pass through the fresnel lens and the liquid crystal display, are then reflected and polarized by the polarizer, pass back through the liquid crystal display where the phase of the light rays is modulated, and pass back through the fresnel lens.

2. A reflective liquid crystal display overhead projection system, comprising:
   a first linear polarizer which is a reflective micro-prism array MacNeille polarizer;
   a phase modulating liquid crystal display provided on the first linear polarizer;
   a transmissive fresnel lens provided on the liquid crystal display;
   a second linear polarizer; and
   a projector head, wherein the second linear polarizer is attached to the projector head, and wherein the projector head comprises a projector lamp and a projection lens, wherein unpolarized light rays from the lamp are directed toward the fresnel lens, pass through the fresnel lens and the liquid crystal display, are reflected and polarized by the first linear polarizer, pass back through the liquid crystal display where the phase of the light rays is modulated, pass back through the fresnel lens, and are directed toward and pass through the second linear polarizer and projection lens, whereby an image displayed by the liquid crystal display is projected onto a screen.

3. A reflective liquid crystal display overhead projection system, comprising:
   a first linear polarizer which is a reflective polarizer comprised of a circular polarizer and a quarter-wave retarding plate;
   a phase modulating liquid crystal display provided on the first linear polarizer;
   a transmissive fresnel lens provided on the liquid crystal display;
   a second linear polarizer; and
   a projector head, wherein the second linear polarizer is attached to the projector head, and wherein the projector head comprises a projector lamp and a projection lens, wherein unpolarized light rays from the lamp are directed toward the fresnel lens, pass through the fresnel lens and the liquid crystal display, are reflected and polarized by the first linear polarizer, pass back through the liquid crystal display where the phase of the light rays is modulated, pass back through the fresnel lens, and are directed toward and pass through the second linear polarizer and projection lens, whereby an image displayed by the liquid crystal display is projected onto a screen.

4. A reflective liquid crystal display overhead projection system, comprising:
   a first linear polarizer which is a reflective polarizer;
   a phase modulating liquid crystal display provided on the first linear polarizer;
   a transmissive fresnel lens provided on the liquid crystal display;
   a second linear polarizer comprised of one of a micro-prism array MacNeille polarizer and a birefringent interference polarizer; and
   a projector head, wherein the second linear polarizer is attached to the projector head, and wherein the projector head comprises a projector lamp and a projection lens, wherein unpolarized light rays from the lamp are directed toward the fresnel lens, pass through the fresnel lens and the liquid crystal display, are reflected and polarized by the first linear polarizer, pass back through the liquid crystal display where the phase of the light rays is modulated, pass back through the fresnel lens, and are directed toward and pass through the second linear polarizer and projection lens, whereby an image displayed by the liquid crystal display is projected onto a screen.

5. A reflective liquid crystal display overhead projection system, comprising:
   a first linear polarizer which is a reflective polarizer;
   a phase modulating liquid crystal display provided on the first linear polarizer;
   a transmissive fresnel lens provided on the liquid crystal display;
   a second linear polarizer comprised of a circular polarizer and a quarter-wave retarding plate; and
   a projector head, wherein the second polarizer is attached to the projector head, and wherein the projector head comprises a projector lamp and a projection lens, wherein unpolarized light rays from the lamp are directed toward the fresnel lens, pass through the fresnel lens and the liquid crystal display, are reflected and polarized by the first linear polarizer, pass back through the liquid crystal display where the phase of the light rays is modulated, pass back through the fresnel lens, and are directed toward and pass through the second linear polarizer and projection lens, whereby an image displayed by the liquid crystal display is projected onto a screen.

6. A method of projecting an image displayed by a liquid crystal display onto a screen, comprising:
   directing unpolarized light rays toward an optical stack, wherein the optical stack includes a first linear polarizer which is a reflective micro-prism array MacNeille polarizer, a phase modulating liquid crystal display provided on the reflective polarizer, and a transmissive fresnel lens provided on the liquid crystal display, wherein the unpolarized light rays pass through the fresnel lens and the liquid crystal display;
   reflecting and polarizing the light rays by the use of the first polarizer, wherein the reflected, polarized light rays pass back through the liquid crystal display and the fresnel lens, and then travel toward a projector head;
   analyzing the reflected, polarized light rays with a second linear polarizer attached to the projection head; and
   projecting the reflected, polarized light rays onto a projection screen.

* * * * *